US012586491B2

(12) United States Patent
Kim et al.

(10) Patent No.: US 12,586,491 B2
(45) Date of Patent: Mar. 24, 2026

(54) DISPLAY DEVICE AND METHOD FOR DRIVING THE SAME

(71) Applicant: SAMSUNG DISPLAY CO., LTD., Yongin-si (KR)

(72) Inventors: Dong Woo Kim, Yongin-si (KR); Kwi Hyun Kim, Yongin-si (KR); Se Hyun Lee, Yongin-si (KR); Won Jun Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 141 days.

(21) Appl. No.: 18/410,479

(22) Filed: Jan. 11, 2024

(65) Prior Publication Data

US 2024/0355237 A1      Oct. 24, 2024

(30) Foreign Application Priority Data

Mar. 27, 2023    (KR) ........................ 10-2023-0039715

(51) Int. Cl.
| | |
|---|---|
| *G09G 3/00* | (2006.01) |
| *G06T 7/73* | (2017.01) |
| *G09G 3/3208* | (2016.01) |

(52) U.S. Cl.
CPC .............. *G09G 3/001* (2013.01); *G06T 7/75* (2017.01); *G09G 3/3208* (2013.01);
(Continued)

(58) Field of Classification Search
None
See application file for complete search history.

(56) References Cited

U.S. PATENT DOCUMENTS

| | | | |
|---|---|---|---|
| 2018/0277033 A1* | 9/2018 | Jia ........................... | G06F 3/013 |
| 2019/0354174 A1* | 11/2019 | Young ..................... | G06F 3/013 |
| 2021/0201021 A1* | 7/2021 | Novelli ................... | G06F 3/013 |

FOREIGN PATENT DOCUMENTS

| | | |
|---|---|---|
| KR | 10-0844317 | 7/2008 |
| KR | 10-2019-0069758 | 6/2019 |
| KR | 10-2022-0126074 | 9/2022 |

OTHER PUBLICATIONS

Zhao et al., Haar-lik Features Based Eye Detection Algorithm and Its implementation on TI TMS320DM6446 Platform, IST 2009, May 11-12, 2009 (Year: 2009).*

* cited by examiner

*Primary Examiner* — Yingchun He
(74) *Attorney, Agent, or Firm* — F. CHAU & ASSOCIATES, LLC

(57) ABSTRACT

A display device include a lens, a light source, a display panel including normal pixels and sensor pixels numbering less than the normal pixels to display an image, a reflective member reflecting display light emitted from the display panel toward the lens, and a processor. The processor controls the light source to emit near-infrared light, receive the near-infrared light reflected by a user's eye, converts information input to the sensor pixels into image data, generates eye feature models similar to the image data using a learning algorithm, determines an eye feature model most similar to an eye area of the image data among the generated eye feature models, tracks movement of a pupil center based on the determined eye feature model, and displays the image in high-resolution in a central vision area and the image in low-resolution in a peripheral vision area, using spatial coordinates of the tracked pupil center.

20 Claims, 28 Drawing Sheets

(52) U.S. Cl.
CPC ............... *G06T 2207/10048* (2013.01); *G06T 2207/20081* (2013.01); *G06T 2207/30201* (2013.01); *G09G 2300/0452* (2013.01); *G09G 2320/0233* (2013.01); *G09G 2340/0407* (2013.01); *G09G 2354/00* (2013.01)

200 : 210, 220

200 : 210, 220

410 : 510, 520, 530, 540

1010        1020

1300

1310

1320

DISPLAY DEVICE AND METHOD FOR DRIVING THE SAME

CROSS-REFERENCE TO RELATED APPLICATION

This U.S. Patent application claims priority under 35 U.S.C. § 119 to Korean Patent Application No. 10-2023-0039715 filed on Mar. 27, 2023 in the Korean Intellectual Property Office, the disclosure of which is incorporated by reference in its entirety herein.

1. TECHNICAL FIELD

The present disclosure relates to a display device and a method for driving the same.

2. DISCUSSION OF RELATED ART

Wearable devices that are developed in the form of glasses or a helmet and form a focus at a distance close to or in front of eyes of a user have been developed. For example, the wearable device may be a head mounted display (HMD) device or augmented reality (AR) glasses. Such a wearable device may include an augmented reality (AR) screen or a virtual reality (VR) screen.

However, the user of the HMD device or the AR glasses may become dizzy unless the resolution of the corresponding screen is at least 2000 pixels per inch (PPI). An organic light emitting diode on silicon (OLEDoS) technology may be used to create a small organic light emitting display device having a high resolution. The organic light emitting diode on silicon (OLEDoS) technology disposes organic light emitting diodes (OLEDs) on a semiconductor wafer substrate on which a complementary metal oxide semiconductor (CMOS) is disposed.

A display device applied to the wearable device tracks movement of an eye of the user and changes resolution of the screen based on the tracked movement. However, screen quality may deteriorate due to the process that performs the tracking and it may be difficult to track movement of the eye accurately.

SUMMARY

Aspects of the present disclosure provide a display device capable of preventing deterioration of screen quality due to sensor pixels sensing reflected light for an eye tracking function, and a method for driving the same.

Aspects of the present disclosure also provide a display device capable of providing an eye tracking function with increased accuracy, and a method for driving the same.

According to an embodiment of the present disclosure, a display device includes a transparent layer, a light source, a display panel, a reflective member, and a processor. The transparent layer is disposed to correspond to a display area of a lens. The light source emits near-infrared light. The display panel includes normal pixels to display an image and sensor pixels including photodiodes. The number of sensor pixels is smaller than the number of the normal pixels. The reflective member reflects display light emitted from the display panel toward the transparent layer. The processor is configured to control the light source to emit the near-infrared light, receive the near-infrared light reflected by an eye of a user through the sensor pixels, convert information input to the sensor pixels into image data, generate eye feature models similar to the image data using a learning algorithm, determine an eye feature model most similar to an eye area of the image data among the generated eye feature models, track movement of a pupil center of the eye based on the determined eye feature model to determine spatial coordinates of the pupil center, and display a first part of the image in a high-resolution screen in a central vision area corresponding to a direction of a sight line of the user and display a second part of the image in a low-resolution in a peripheral vision area excluding the central vision area, using the spatial coordinates.

The processor may be configured to determine whether or not a designated time has elapsed from a point in time when the near-infrared light may be emitted, compare each of the eye feature models generated during the designated time with the eye area of the image data when the designated time has elapsed to generate a comparison result, calculate scores indicating similarities of the eye area of the image data for each of the eye feature models based on the comparison result, and select an eye feature model among the eye feature models having a highest score among the scores.

The processor may be configured to set the image data, spatial coordinates of the image data, and light intensity values for each area of the image data mapped to the spatial coordinates as input variables input to the learning algorithm.

The learning algorithm may be configured to perform learning by executing an artificial intelligence application stored in a memory by the processor.

The learning algorithm may be configured to generate the eye feature model by performing an operation of detecting an eye area, an operation of detecting a pupil area, and an operation of extracting the pupil center.

The learning algorithm may be configured to extract an eye feature including an eye size, an eye shape, and an eye feature point using a Haar-like feature.

The learning algorithm may be configured to learn the eye feature model generated using the Haar-like feature using an adaptive boost (AdaBoost) algorithm.

The Haar-like feature may be set to generate the eye feature model by summing up prototypes according to a form of edge features including one white area and one black area which are disposed in parallel with each other.

The Haar-like feature may be set to generate the eye feature model by summing up prototypes according to a form of line features including a pair of white areas and a black area disposed between the pair of white areas.

The Haar-like feature may be set to generate the eye feature model by summing up prototypes according to a form of center-surround features including one black area and a white area disposed to surround the one black area. The black area and the white area may have a rectangular shape or a circular shape.

According to an embodiment of the present disclosure, a method for driving a display device including a transparent layer, a light source, a display panel, and a reflective member is provided. The transparent layer is disposed to correspond to a display area of a lens. The light source emits near-infrared light. The display panel includes normal pixels that display and sensor pixels including photodiodes. The number of sensor pixels is smaller than the number of the normal pixels. The reflective member is for reflecting display light emitted from the display panel toward the transparent layer. The method includes controlling the light source to emit the near-infrared light, receiving the near-infrared light reflected by an eye of a user through the sensor pixels, converting information input to the sensor pixels into image data, generating eye feature models similar to the image data using a learning algorithm, determining an eye feature model most similar to an eye area of the image data among the generated eye feature models, tracking movement of a pupil center of the eye based on the determined eye feature model to determine spatial coordinates of the pupil center, and displaying a first part of the image in high-resolution in a central vision area corresponding to a direction of a sight line of the user and displaying a second part of the image in low-resolution screen in a peripheral vision area excluding the central vision area, using the spatial coordinates.

The determining of the eye feature model most similar to the eye area of the image data may include determining whether or not a designated time has elapsed from a point in time when the near-infrared light is emitted, comparing each of the eye feature models generated during the designated time with the eye area of the image data when the designated time has elapsed to generate a comparison result, calculating scores indicating similarities of the eye area of the image data for each of the eye feature models based on the comparison result, and selecting an eye feature model having a highest score among the scores.

The method for driving the display device may further include setting the image data, spatial coordinates of the image data, and light intensity values for each area of the image data mapped to the spatial coordinates as input variables input to the learning algorithm.

The learning algorithm may be configured to perform learning by executing an artificial intelligence application stored in a memory by a processor.

The learning algorithm may be configured to generate the eye feature model by performing an operation of detecting an eye area, an operation of detecting a pupil area, and an operation of extracting the pupil center.

The learning algorithm may be configured to extract an eye feature including an eye size, an eye shape, and an eye feature point using a Haar-like feature.

The learning algorithm may be configured to learn the eye feature model generated using the Haar-like feature using an adaptive boost (AdaBoost) algorithm.

The Haar-like feature may be set to generate the eye feature model by summing up prototypes according to a form of edge features including one white area and one black area which are disposed in parallel with each other. The Haar-like feature may be set to generate the eye feature model by summing up prototypes according to a form of line features including a pair of white areas and a black area disposed between the pair of white areas.

The Haar-like feature may be set to generate the eye feature model by summing up prototypes according to a form of center-surround features including one black area and a white area disposed to surround the one black area. The black area and the white area may have a rectangular shape or a circular shape.

With a display device and a method for driving the same according to exemplary embodiments, it is possible to prevent deterioration of screen quality due to sensor pixels sensing reflected light for an eye tracking function.

In addition, it is possible to provide a high-quality augmented reality (AR) screen and/or virtual reality (VR) screen by providing an eye tracking function with increased accuracy.

BRIEF DESCRIPTION OF THE DRAWINGS

The above and other aspects and features of the present disclosure will become more apparent by describing in detail example embodiments thereof with reference to the attached drawings, in which.

DETAILED DESCRIPTION OF THE EMBODIMENTS

The present invention will now be described more fully hereinafter with reference to the accompanying drawings, in which example embodiments thereof are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

It will also be understood that when a layer is referred to as being "on" another layer or substrate, it can be directly on the other layer or substrate, or intervening layers may also be present. The same reference numbers indicate the same components throughout the specification.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

Features of each of various embodiments of the present disclosure may be partially or entirely combined with each other and may technically variously interwork with each other, and respective embodiments may be implemented independently of each other or may be implemented together in association with each other.

Hereinafter, specific embodiments will be described with reference to the accompanying drawings.

Figure 1:
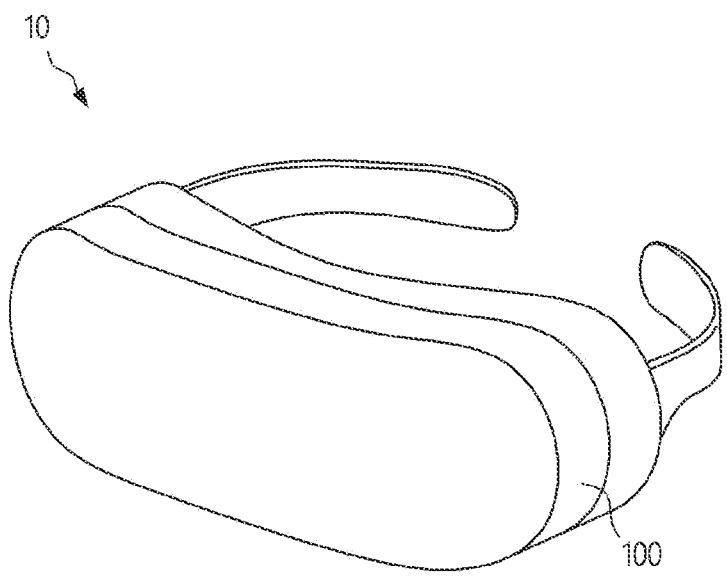
FIG. 1 is a view illustrating a front surface of a wearable device including a display device according to an example embodiment.
Figure 2:
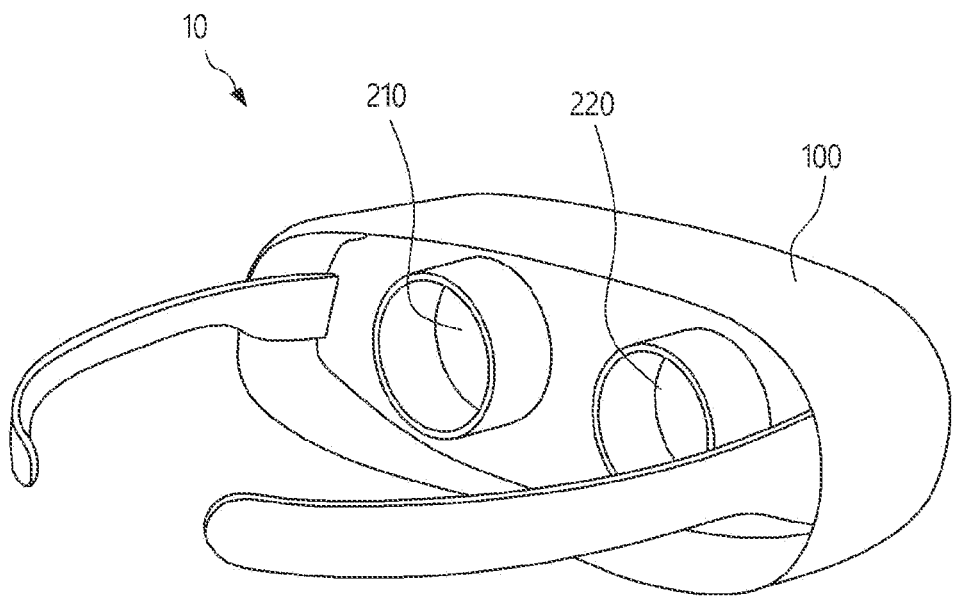
FIG. 2 is a view illustrating a rear surface of the wearable device illustrated in FIG. 1.

FIG. 1 is a view illustrating a front surface of a wearable device 100 including a display device 10 according to an exemplary embodiment. FIG. 2 is a view illustrating a rear surface of the wearable device 100 illustrated in FIG. 1.

Referring to FIGS. 1 and 2, the display device 10 according to an exemplary embodiment may be a display device included in a head mounted display (HMD) device. The display device 10 may be disposed inside a body of the HMD device, and a lens 200 displaying a screen may be disposed on a rear surface of the body of the HMD device. The lens 200 may include a left eye lens 210 corresponding to a left eye of a user and a right eye lens 220 corresponding to a right eye of the user. Each of the left eye lens 210 and the right eye lens 220 may include a glass or a transparent layer for displaying a screen or an image output from the display device 10. A method for displaying the screen or the image through the glass of the display device 10 will be described later in detail with reference to FIGS. 5 and 9.

Figure 3:
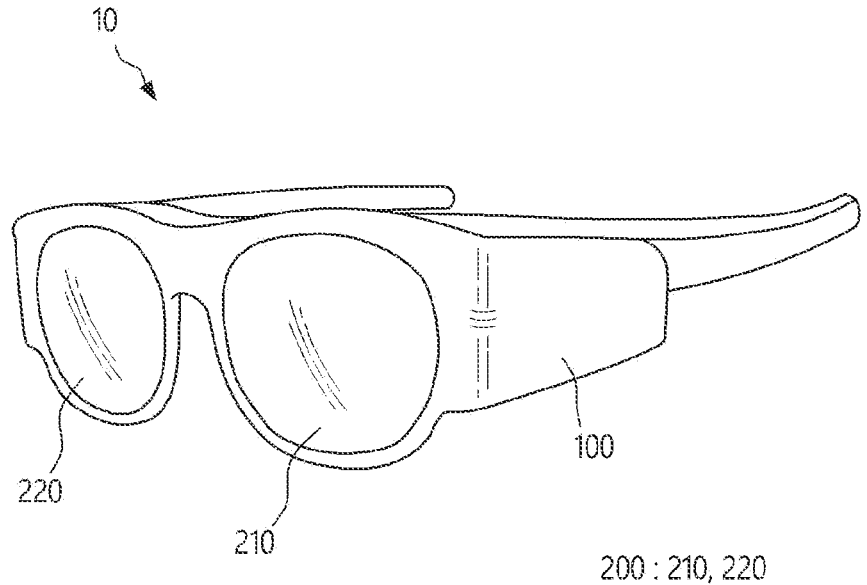
FIG. 3 is a view illustrating another example of a wearable device including a display device according to an exemplary embodiment.

FIG. 3 is a view illustrating another example of a wearable device 100 including a display device 10 according to an exemplary embodiment.

Referring to FIG. 3, the display device 10 according to an exemplary embodiment may be a display device included in augmented reality (AR) glasses. The AR glasses may have a shape of glasses and may include a see-through lens. The see-through lens may include the left eye lens 210 corresponding to the left eye of the user and the right eye lens 220 corresponding to the right eye of the user. Each of the left eye lens 210 and the right eye lens 220 may include a glass for displaying a screen or an image output from the display device 10. A method for displaying the screen through the glass of the display device 10 will be described later in detail with reference to FIGS. 5 and 9.

Figure 4:
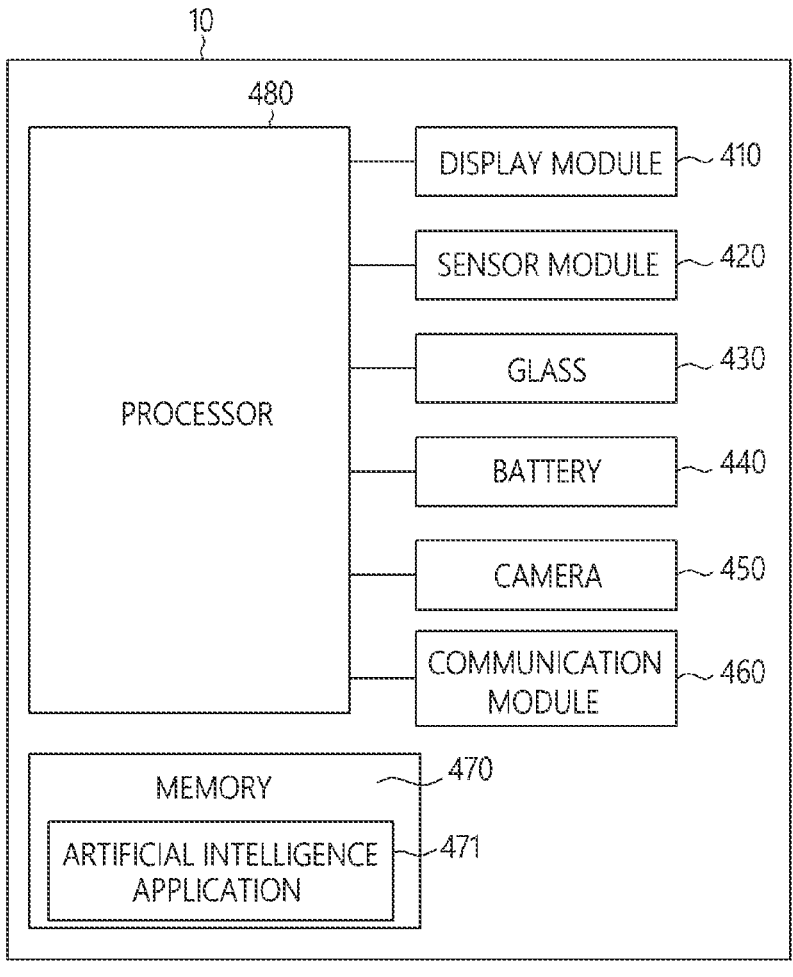
FIG. 4 is a block diagram illustrating components of a display device according to an example embodiment.
Figure 5:
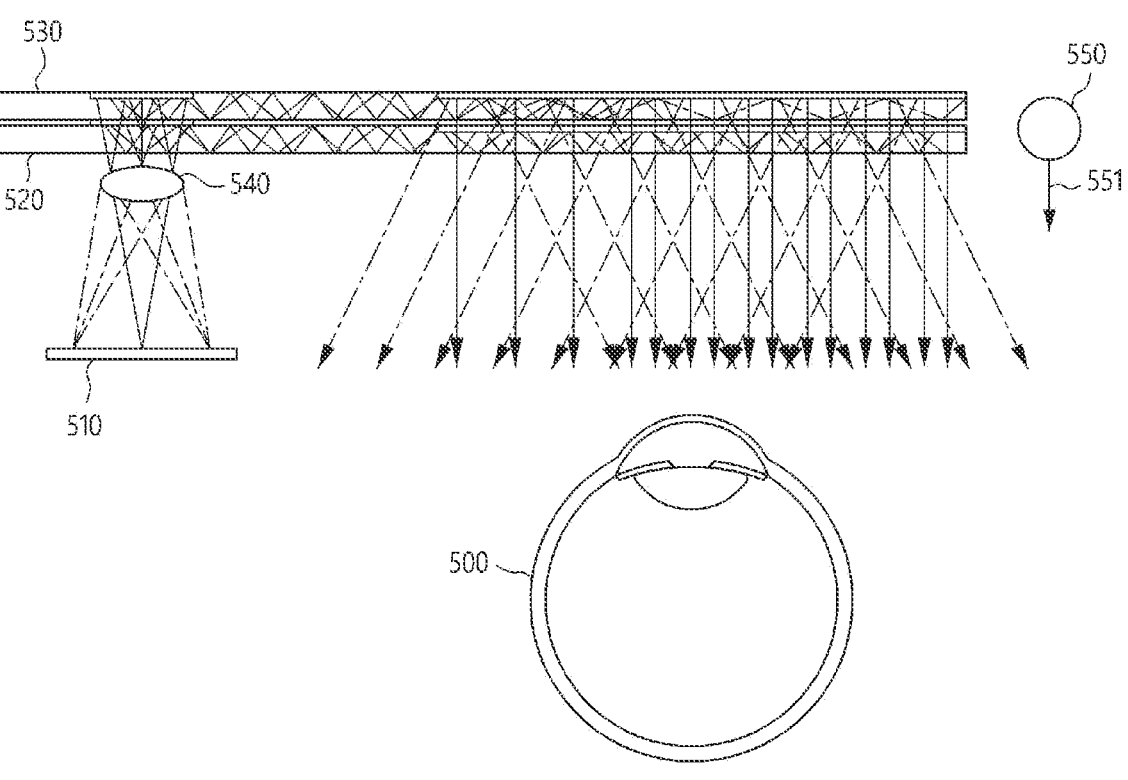
FIG. 5 is a view illustrating a configuration of a display module according to an example embodiment.

FIG. 4 is a block diagram illustrating components of a display device 10 according to an exemplary embodiment. FIG. 5 is a view illustrating a configuration of a display module of the display device 10 according to an exemplary embodiment. For example, FIG. 5 illustrates an optical path along which display light output from a display panel 510 of the display device 10 moves.

The display device 10 illustrated in FIGS. 4 and 5 may be applied to the HMD device illustrated in FIGS. 1 and 2 or the AR glasses illustrated in FIG. 3.

Referring to FIGS. 4 and 5, the display device 10 according to an exemplary embodiment may include a display module 410 (e.g., a display panel, pixels, etc.), a sensor module 420 (e.g., a sensor or sensor device), glass 430, a battery 440, a camera 450, a communication module 460 (e.g., a transceiver), a memory 470, and a processor 480. the display device 10 may include components other than that illustrated in FIG. 4. One or more of the components illustrated in FIG. 4 may be omitted in alternate embodiments. The glass 430 may represent or be replaced with a transparent material or layer other than glass such as plastic.

The processor 480 may control operations of components (e.g., the display module 410, the sensor module 420, the battery 440, the camera 450, and the communication module 460) of the display device 10 by executing instructions stored in the memory 470. The processor 480 may be electrically and/or operatively connected to the display module 410, the sensor module 420, the battery 440, the camera 450, and the communication module 460. The processor 480 may control one or more other components (e.g., the display module 410, the sensor module 420, the battery 440, the camera 450, and the communication module 460)

connected to the processor 480 by executing software. The processor 480 may obtain commands from the components included in the display device 10, interpret the obtained commands, and process and/or calculate various data according to the interpreted commands. According to an exemplary embodiment, the processor 480 may be replaced with a display driver IC (DDI). For example, at least some operations of the display device 10 performed by the processor 480 in the present disclosure may be operations performed by the DDI.

The memory 470 may store various data used by the components of the display device 10, for example, the processor 480 or the sensor module 420. Here, the data may include input data or output data on software such as an application program and commands related to the software. The memory 470 may include a volatile memory and/or a non-volatile memory. The memory 470 may store an artificial intelligence application 471 for performing an eye tracking function. The display device 10 may execute the artificial intelligence application 471 stored in the memory 470 and generate an artificial intelligence model based on the executed artificial intelligence application 471. The artificial intelligence model may be generated by machine learning, and such learning may be performed in the display device 10 itself or be performed in conjunction with an external device such as a server (not illustrated).

A learning algorithm for performing the machine learning may include, for example, supervised learning, unsupervised learning, semi-supervised learning, or reinforcement learning, but is not limited thereto. The artificial intelligence model may include a plurality of artificial neural network layers. An artificial neural network may be one of a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof, but is not limited thereto.

The display device 10 may receive data processed through a processor embedded in an external device (e.g., a smartphone or a tablet personal computer (PC)) (not illustrated) from the external device. For example, the display device 10 may capture an image of an object (e.g., a real object or a user's eye) through the camera 450 and transmit the captured image to the external device through the communication module 460. The display device 10 may receive data based on the image captured by the display device 10 from the external device. The external device may generate image data related to augmented reality based on information (e.g., a shape, a color, or a position) of the object of which the image is captured, received from the display device 10, and transmit the image data to the display device 10. The display device 10 may request additional information based on the image of the object (e.g., the real object or the user's eye) captured through the camera 450 from the external device, and may receive the additional information from the external device.

The display module 410 may include a display panel (e.g., the display panel 510 of FIG. 5) and light transfer members (e.g., waveguides 520 and 530) transferring light emitted from the display panel 510 to a portion of the glass 430. In the present disclosure, the display panel 510 may refer to a light source unit generating display light input to the waveguides 520 and 530 (see FIG. 5). The display panel 510 may be a display panel to which an organic light emitting diode on silicon (OLEDoS) technology is applied. For example, the display panel 510 may include an organic light emitting diode (OLED) disposed on a semiconductor wafer substrate on which a complementary metal oxide semiconductor (CMOS) is disposed. The display panel 510 may be manufactured using the OLEDOS technology.

The display panel 510 of the display module 410 may emit display light for displaying an augmented reality image (or a virtual reality image) based on the control of the processor 480. For example, the display light emitted from the display panel 510 may be transferred to a display area of the lens 200 (see FIG. 2 or FIG. 3) through the waveguides 520 and 530, and accordingly, a user may view the display light. The display device 10 (e.g., the processor 480) may control the display panel 510 in response to a user's input. Types of the user's input may include a button input, a touch input, a voice input, and/or a gesture input, but are not limited thereto, and may include various input methods capable of controlling an operation of the display panel 510.

The display device 10 may further include a light source unit 550 (e.g., a light source) for tracking the movement of a user's eye 500. The light source unit 550 may be configured to emit light different from the display light emitted by the display panel 510. In an embodiment, the light source unit 550 is configured to radiate the user's eye with near-infrared light 551. In an embodiment, the near-infrared light 551 has an output wavelength of about or exactly 780 nanometer (nm) to about or exactly 1400 nm. The near-infrared light 551 emitted from the light source unit 550 may be reflected from the user's eye 500, and the reflected near-infrared light may be input to the display panel 510. The display panel 510 may include a sight line tracking sensor (e.g., a sensor pixel SS of FIG. 6) as an optical sensor for tracking the movement of the user's eye 500 using the input reflected light. Here, the sight line tracking sensor may include a photodiode PD (see FIG. 8) disposed in a sensor pixel of the display panel 510.

When the display device 10 displays an augmented reality (AR) screen or a virtual reality (VR) screen, the display device 10 tracks the movement of the user's eye using the photodiode PD (FIG. 8) and changes resolution of the screen based on the tracked movement of the user's eye. For example, the display device 10 senses a direction of a sight line of the user using an eye tracking function and determines a central vision area corresponding to the sight line and a peripheral vision area excluding the central vision area. In an embodiment, the display device 10 applies a foveated rendering technology that displays a high-resolution screen (or a high-resolution image) in the central vision area and displays a low-resolution screen (or low-resolution image) in the peripheral vision area. The display device 10 may perform the eye tracking function using a learning function of the artificial intelligence application 471.

The glass 430 may be disposed to correspond to the display area of the lens 200 (see FIG. 2 or FIG. 3) of the wearable device. For example, the glass 430 may be included in each of the left eye lens 210 (see FIG. 1 or FIG. 3) and the right eye lens 220 (see FIG. 1 or FIG. 3).

The glass 430 may include the waveguides 520 and 530 as reflective members, and the waveguides 520 and 530 may include at least one of a display waveguide 520 and a sight line tracking waveguide 530.

The display waveguide (e.g., a first waveguide) 520 may form a light path by guiding the display light emitted from the display panel 510 so that the display light is emitted to the display area of the lens 200 (see FIG. 2 or FIG. 3). For example, the display area of the lens 200 (see FIG. 2 or FIG. 3) may be an area in which light propagating inside the display waveguide 520 is emitted.

The display waveguide 520 may include at least one of at least one diffractive element or reflective element (e.g., a reflective mirror). The display waveguide 520 may guide the display light emitted from the display panel 510 to the user's eye 500 using at least one diffractive element or reflective element included in the display waveguide 520. For example, the diffractive element may include an input/output grating, and the reflective element may include a total internal reflection (TIR) element. An optical material (e.g., glass) may be manufactured in the form of a wafer and used as the display waveguide 520. In an embodiment, a refractive index of the display waveguide 520 varies from about or exactly 1.5 to about or exactly 1.9.

The display waveguide 520 may include a material (e.g., glass or plastic) capable of totally reflecting the display light for assisting in guiding the display light to the user's eye 500. However, a material of the display waveguide 520 is not limited to the above-described example.

The display waveguide 520 may split the display light emitted from the display panel 510 according to a wavelength (e.g., blue, green, or red), and allow each split display light to move along a separate path within the display waveguide 520.

The display waveguide 520 may be disposed in a portion of glass 430. For example, based on a virtual axis on which a central point of the glass 430 coincides with a central point of the user's eye 500 and a virtual line orthogonal to the virtual axis at the central point of the glass 430, the display waveguide 520 may be disposed at an upper end of the glass 430. However, an area in which the display waveguide 520 is disposed is not limited to the above-described area of the glass 430. For example, the display waveguide 520 may be disposed in any area of the glass 430 in which an amount of light reflected from the user's eye 500 becomes a reference value or more.

The sensor module 420 may include at least one sensor (e.g., a sight line tracking sensor and/or an illuminance sensor). However, the at least one sensor is not limited to the above-described example. For example, the at least one sensor may further include a proximity sensor or a contact sensor capable of sensing whether or not the user wears the display device 10. The display device 10 may sense whether or not the user is in a state in which he/she wears the display device 10 through the proximity sensor or the contact sensor. When the display device 10 senses that the user is in the state in which he/she wears the display device 10, the display device 10 may manually and/or automatically pair with another electronic device (e.g., a smartphone).

The sight line tracking sensor may sense reflected light reflected from the user's eye 500 based on the control of the processor 480. The display device 10 may convert the reflected light sensed through the sight line tracking sensor into an electrical signal. The display device 10 may obtain an image of a user's eyeball through the converted electrical signal. The display device 10 may track the sight line of the user using the obtained image of the user's eyeball. For example, the display device 10 may determine a position in which the user's eyeball is looking based on the obtained image or the converted electrical signal.

The illuminance sensor may sense illuminance (or brightness) around the display device 10, an amount of the display light emitted from the display panel, brightness around the user's eye 500, or an amount of the reflected light reflected from the user's eye 500 based on the control of the processor 480. The illuminance sensor may be configured as at least a portion of the sight line tracking sensor.

The display device 10 may sense illuminance (or brightness) around the user using the illuminance sensor. The display device 10 may adjust an amount of light (or brightness) of the display (e.g., the display panel 510) based on the sensed illuminance (or brightness).

The sight line tracking waveguide (e.g., a second waveguide) 530 may form a light path by guiding the reflected light reflected from the user's eye 500 so that the reflected light is input to the sensor module 420. The sight line tracking waveguide 530 may be used to transfer the reflected light to the sight line tracking sensor. The sight line tracking waveguide 530 may be the same element as the display waveguide 520 or a different element from the display waveguide 520.

The sight line tracking waveguide 530 may be disposed in a portion of the glass 430. For example, based on the virtual axis on which the central point of the glass 430 coincides with the central point of the user's eye 500 and the virtual line orthogonal to the virtual axis at the central point of the glass 430, the sight line tracking waveguide 530 may be disposed at a lower end of the glass 430. However, an area in which the sight line tracking waveguide 530 is disposed is not limited to the above-described area of the glass 430. For example, the sight line tracking waveguide 530 may be disposed in any area of the glass 430.

The battery 440 may supply power to one or more components of the display device 10. The battery 440 may be charged by being connected to an external power source in a wired manner or a wireless manner.

The camera 450 may capture an image around the display device 10. For example, the camera 450 may capture an image of the user's eye 500 or capture an image of a real object outside the display device 10.

The communication module 460 may include a wired interface or a wireless interface. The communication module 460 may support direct communication (e.g., wired communication) or indirect communication (e.g., wireless communication) between the display device 10 and the external device (e.g., a smartphone or a tablet PC).

The communication module 460 may include a wireless communication module (e.g., a cellular communication module, a short-range wireless communication module, or a global navigation satellite system (GNSS) communication module) or a wired communication module (e.g., a local area network (LAN) communication module or a power line communication module).

The wireless communication module may support a 5G network after a 4G network and a next-generation communication technology such as a new radio (NR) access technology. The NR access technology may support high-speed transmission of high-capacity data (enhanced mobile broadband (eMBB)), minimization of terminal power and access of multiple terminals (massive machine type communications (mMTC)), or high reliability and low latency (ultra-reliable and low-latency (URLLC) communications)). The wireless communication module may support a high frequency band (e.g., mmWave band) to achieve a high data rate, for example.

The wireless communication module may include a short-range wireless communication module. The short-range communication may include at least one of wireless fidelity (WiFi), Bluetooth, Bluetooth low energy (BLE), Zigbee, near field communication (NFC), magnetic secure transmission, radio frequency (RF), or body area network (BAN).

Referring to FIG. 5, the display module 410 includes the display panel 510 outputting the display light, the waveguides 520 and 530, and a projection lens 540.

The projection lens 540 may be configured to input the light emitted from the display panel 510 to the waveguides 520 and 530. It has been illustrated in FIG. 5 that some of light fluxes emitted from the display panel 510 are input to the waveguides 520 and 530 through the projection lens 540.

The waveguides 520 and 530 may have a shape of a plate or a rectangle. The waveguides 520 and 530 may include gratings having a diffractive function, such as diffraction optical elements (DOE) or holographic optical elements (HOE), in a partial area of the plate. A period, a depth, or a refractive index of the gratings of the waveguides 520 and 530 may be variously changed based on conditions such as an angle of view of an output image or a refractive index of a plate medium. The waveguides 520 and 530 may split optical signals (i.e., the display light) input from the display panel 510 so as to transfer some of the optical signals to the inside of the waveguides 520 and 530 and output the others of the optical signals to the outside of the waveguides 520 and 530.

In FIG. 5, diffractive optical elements have been described as examples of the waveguides 520 and 530, but the waveguides may be replaced with reflective optical elements such as beamsplitters.

Figure 6:
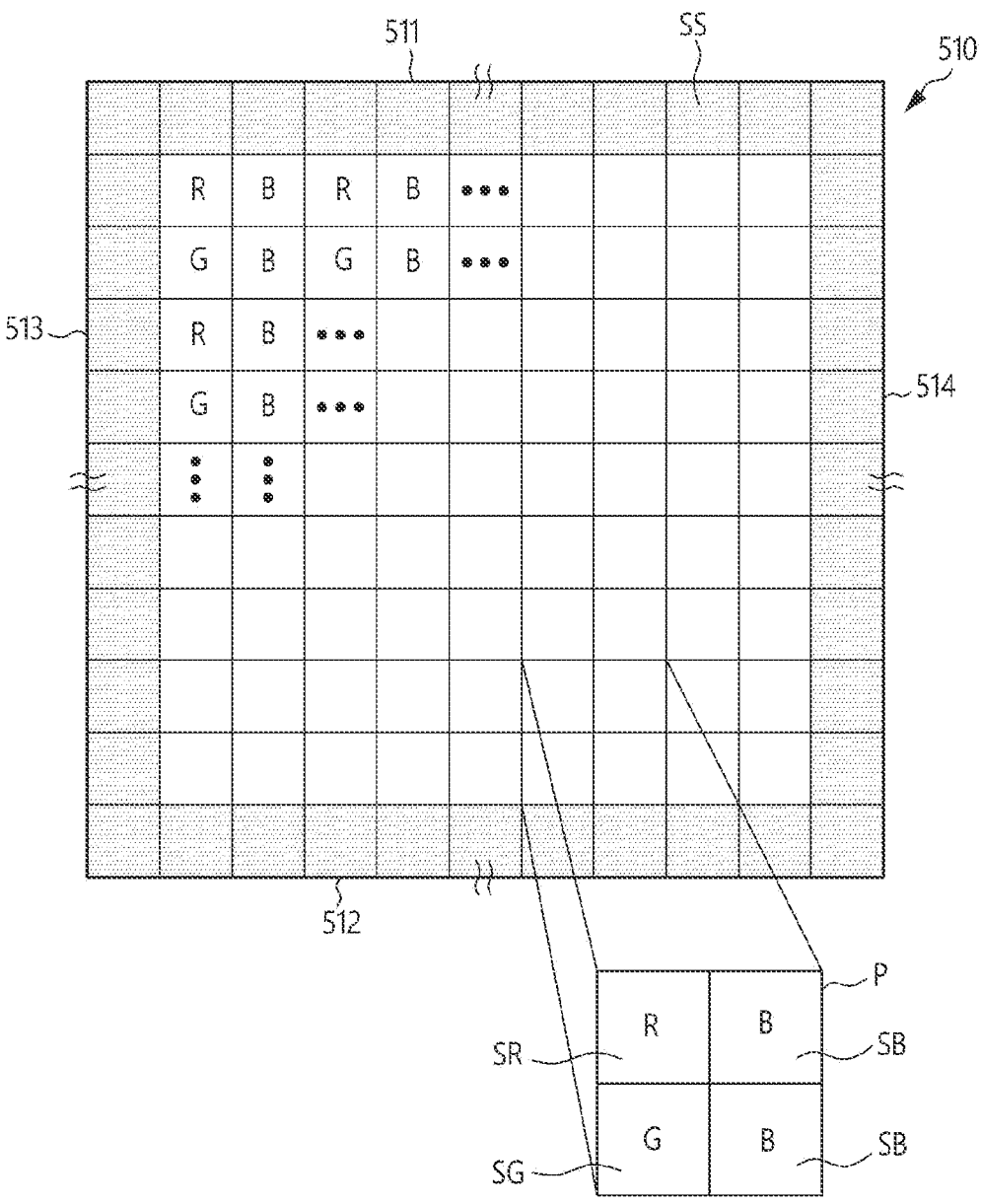
FIG. 6 is a plan view of a display panel according to an example embodiment.
Figure 7:
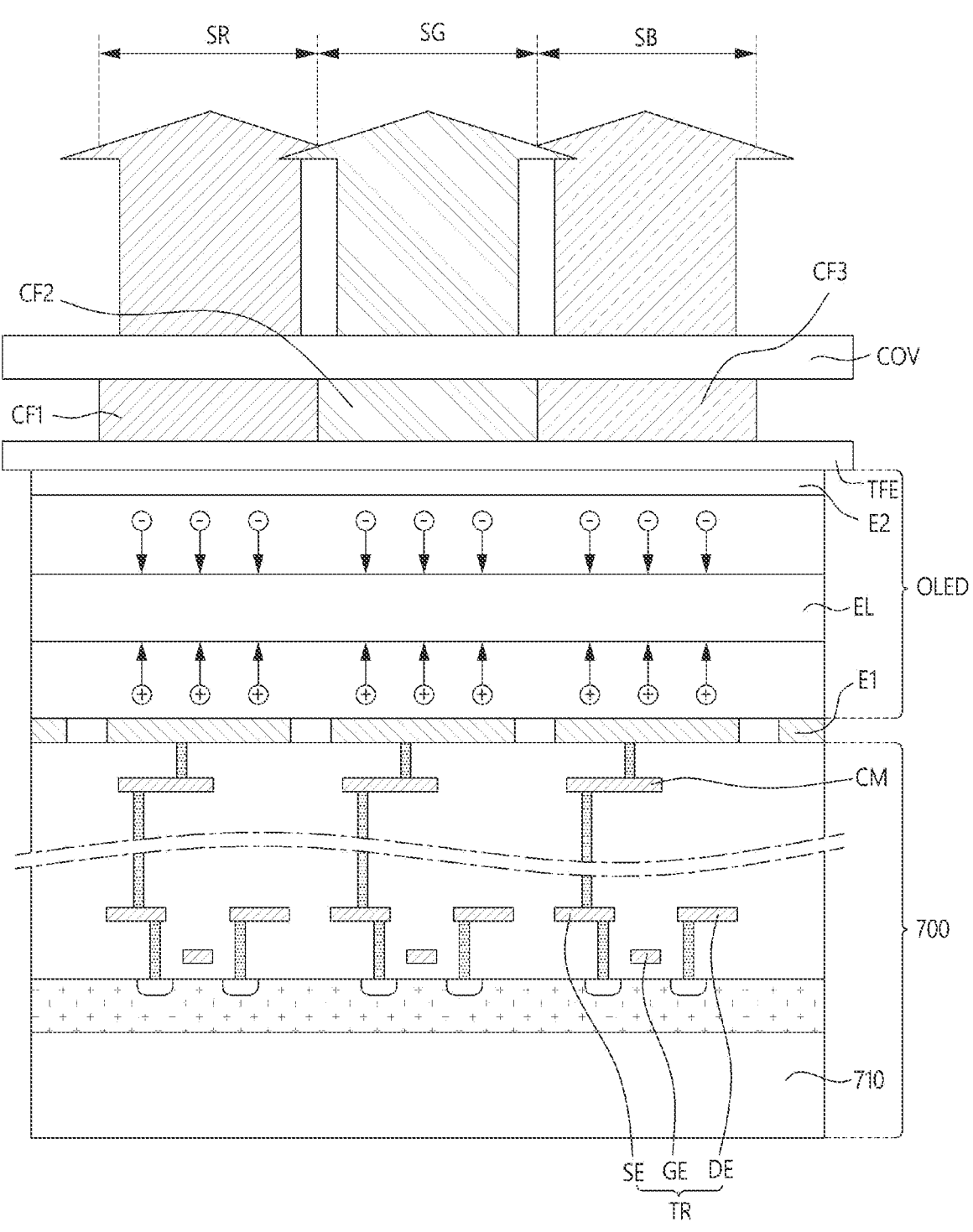
FIG. 7 is a cross-sectional view illustrating an emission area of the display panel according to an example embodiment.
Figure 8:
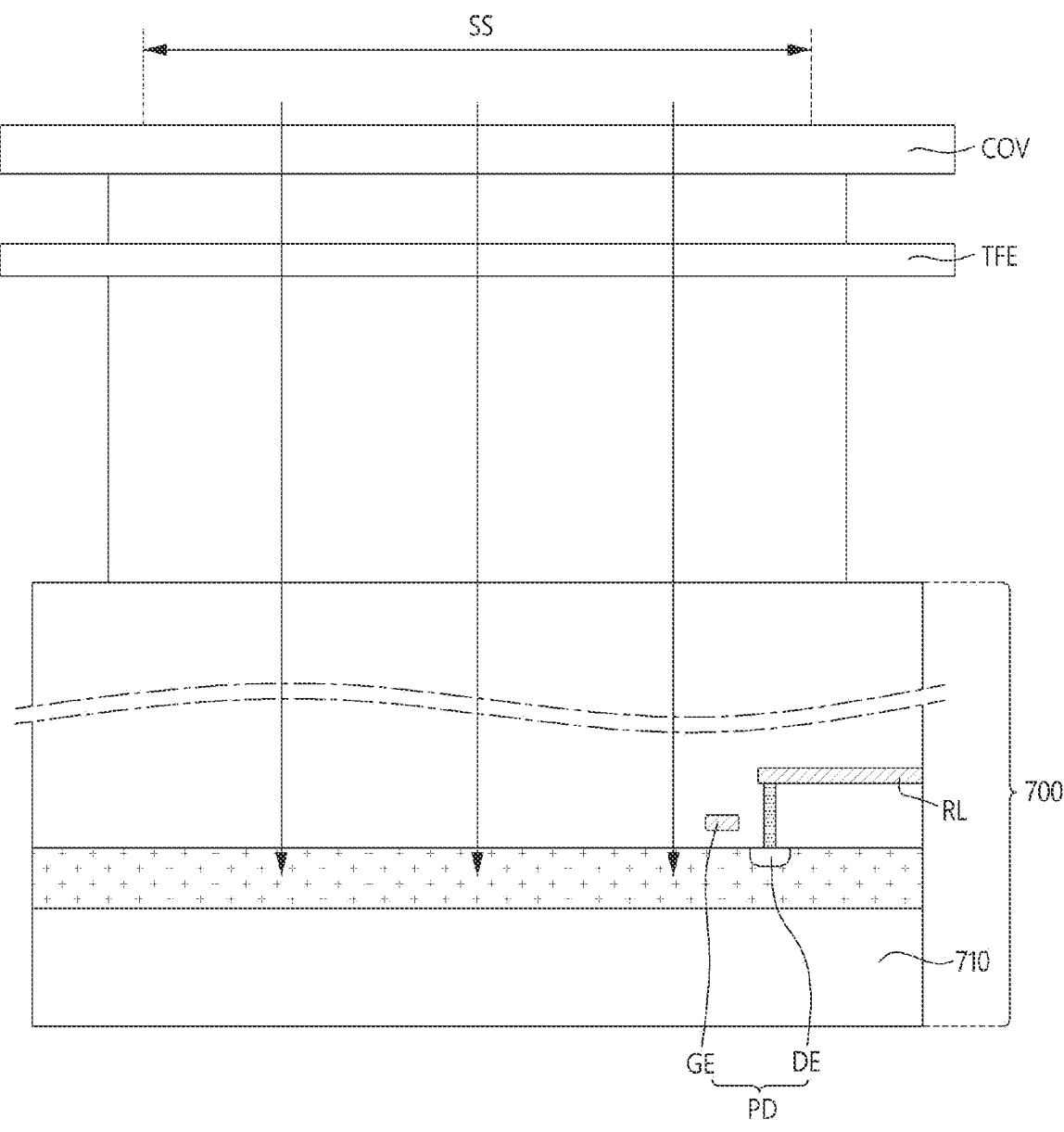
FIG. 8 is a cross-sectional view illustrating a sensor area of the display panel according to an example embodiment.

FIG. 6 is a plan view of a display panel 510 according to an example embodiment. FIG. 7 is a cross-sectional view illustrating an emission area of the display panel 510 according to an example embodiment. FIG. 8 is a cross-sectional view illustrating a sensor area of the display panel according to an example embodiment.

Referring to FIG. 6, the display panel 510 according to the exemplary embodiment includes a plurality of sensor pixels SS and a plurality of pixel groups P. All of the pixels of the pixel groups P may be collectively referred to as normal pixels. The normal pixels may be for presenting an image, whereas the sensor pixels may be for sensing light.

The plurality of sensor pixels SS may be disposed to surround the display panel 510 on the outermost side of the display panel 510. For example, the plurality of pixel groups P may be disposed inside the display panel 510 and may be disposed to be surrounded by the plurality of sensor pixels SS. The plurality of sensor pixels SS may be disposed adjacent to each of an upper boundary portion 511, a lower boundary portion 512, a left boundary portion 513, and a right boundary portion 514 of the display panel 510. The sensor pixels SS may surround the pixel groups P.

The plurality of pixel groups P may be arranged in a matrix form on a plane of the display panel 510. For example, the display panel 510 may include m*n pixel groups P (e.g., unit pixels), and the plurality of sensor pixels SS may be disposed outside the m*n pixel groups P. Here, each of m and n may be an integer greater than 1. In the present disclosure, the sign "*" refers to a multiplication sign.

Each of the plurality of pixel groups P may be divided into i*i sub-areas, and at least one red pixel SR, at least one green pixel SG, and at least one blue pixel SB may be disposed in the sub-areas, respectively. Here, i may be an integer greater than 1. For example, one pixel group P may includes 2*2 sub-areas, and any one of a red pixel SR, a green pixel SG, and a blue pixel SB is disposed in each of the sub-areas. In an embodiment, one pixel group P includes at least a first pixel of a first color, a second pixel of second color, and a third pixel of a third color, where the first color, second color, and third color are different from one another, but need not be red, green, and blue. As compared with a comparative example in which any one of the red pixel SR, the green pixel SG, and the blue pixel SB and a photodiode PD are disposed in each of all sub-areas, in an exemplary embodiment of FIG. 6, sensing performance may be increased and sharpness of an image may be increased. That is, in a comparative example, a photodiode PD having a dot shape may be disposed in a portion of each of the red pixel SR, the green pixel SG, and the blue pixel SB, but in such a comparative example, when the display panel 510 is driven, mura having a dot shape may be sensed on a screen. On the other hand, in an exemplary embodiment of FIG. 6, by separately disposing the sensor pixels SS and the red pixels SR, the green pixels SG, and the blue pixels SB for displaying an image, it is possible to increase sensing performance and prevent mura having a dot shape to increase sharpness of the image.

As such, the display panel 510 may include the sensor pixels SS. In an embodiment, a resolution of the sensor pixels SS is lower than resolution of each of the red pixels SR, the green pixels SG, and the blue pixels SB. However, when the resolution of the sensor pixels SS is too low, accuracy of an eye tracking function when performing the eye tracking function may be decreased. An embodiment of the present disclosure may increase the accuracy of the eye tracking function even when the resolution of the sensor pixels SS is low by using a learning algorithm described with reference to FIGS. 9 to 14. The resolution of the sensor pixels SS lower than the resolution of each of the red pixels SR, the green pixels SG, and the blue pixels SB in the display panel 510 means that the number or an arrangement density of sensor pixels SS is smaller than the number or an arrangement density of each of red pixels SR, green pixels SG, and blue pixels SB in the display panel 510.

It has been illustrated in FIG. 6 that one pixel group P includes one red pixel SR, one green pixel SG, and two blue pixels SB, but an arrangement form of pixels included in each pixel group P may be variously changed and designed.

The red pixel SR includes a red color filter CF1, and is configured to emit red light by transmitting the red light through the red color filter CF1. According to another exemplary embodiment, the red pixel SR may be configured so that a light emitting layer EL directly emits the red light, and in this case, the red color filter CF1 may be omitted.

The green pixel SG includes a green color filter CF2, and is configured to emit green light by transmitting the green light through the green color filter CF2. According to another exemplary embodiment, the green pixel SG may be configured so that a light emitting layer EL directly emits the green light, and in this case, the green color filter CF2 may be omitted.

The blue pixel SB includes a blue color filter CF3, and is configured to emit blue light by transmitting the blue light through the blue color filter CF3. According to another exemplary embodiment, the blue pixel SB may be configured so that a light emitting layer EL directly emits the blue light, and in this case, blue color filter CF3 may be omitted.

As shown in FIG. 8, the, the sensor pixel SS may include a photodiode PD to sense the reflected light reflected from the user's eye 500. The photodiode PD may convert the sensed reflected light into an electrical signal and supply the converted electrical signal to the sensor module 420.

Referring to FIG. 7, the display panel 510 may include a semiconductor wafer substrate 700, an OLED disposed on the semiconductor wafer substrate 700, and color filters CF1, CF2, and CF3 disposed on the OLED. A thin film encapsulation layer TFE covering a light emitting layer EL of the OLED may be disposed between the OLED and the color filters CF1, CF2, and CF3. A cover window COV may be disposed on the color filters CF1, CF2, and CF3. The cover window COV may be attached onto the color filters CF1, CF2, and CF3 by a transparent adhesive member such as an optically clear adhesive (OCA) film.

The semiconductor wafer substrate 700 may include a base substrate 710 and transistors TR disposed on the base substrate 710.

The base substrate 710 may be a silicon substrate. The base substrate 710 may have semiconductor patterns formed on the silicon substrate. For example, the base substrate 710 may be a silicon semiconductor substrate formed through a complementary metal oxide semiconductor (CMOS) process. The base substrate 710 may include any one of a monocrystalline silicon wafer, a polycrystalline silicon wafer, and/or an amorphous silicon wafer.

The transistor TR disposed on the base substrate 710 may include a gate electrode GE, a source electrode SE, and a drain electrode DE. The transistor TR may be configured to independently control the red pixel SR, the green pixel SG, and the blue pixel SB included in each of the plurality of pixel groups P. Connection electrodes CM electrically connected to the transistors TR, conductive lines, and conductive pads may be further disposed on the base substrate 710. The connection electrodes CM, the conductive lines, and the conductive pads may include a conductive material such as a metal material.

Referring to FIG. 8, the sensor pixel SS may include a photodiode PD. The photodiode PD may sense the reflected light reflected from the user's eye 500 and convert the sensed reflected light into an electrical signal. The photodiode PD may include a gate electrode GE controlling an output of the electrical signal and a drain electrode DE outputting the electrical signal to a read-out line RL. The photodiode PD may output the electrical signal corresponding to the sensed reflected light through the drain electrode DE in response to a control signal input to the gate electrode GE. A control circuit may be present in the sensor module 420 to output the control signal or the processor 480 may output the control signal. The electrical signal from the photodiode PD may be transferred to the processor 480 outside the display panel 510 through the read-out line RL.

The OLED including first electrodes E1, a light emitting layer EL, and a second electrode E2 may be disposed on the semiconductor wafer substrate 700.

The first electrodes E1 may be electrically connected to the transistors TR through the connection electrodes CM of the semiconductor wafer substrate 700 and at least one contact hole connected to the connection electrodes CM. The first electrodes E1 may be anode electrodes for driving the light emitting layer EL of each of the red pixel SR, the green pixel SG, and the blue pixel SB. The first electrodes E1 may be reflective electrodes. For example, the first electrodes E1 may reflect light emitted from the light emitting layer EL in a downward direction. The first electrodes E1 may include a metal material having high light reflectivity. For example, the first electrodes may reflect light towards the photodiode PD. For example, the first electrodes E1 may include any one of Al, Al/Cu, and Al/TiN. As illustrated in FIG. 8, the first electrodes E1 are not formed in the sensor pixel SS. That is, the sensor pixel SS does not include the first electrodes E1.

The light emitting layer EL may be disposed on the first electrodes E1. The light emitting layer EL may include a single layer or a plurality of stacked structures. The light emitting layer EL may be configured to emit white light. For example, the white light may be a mixture of blue light, green light, and red light. Alternatively, the white light may be a mixture of blue light and yellow light. As illustrated in FIG. 8, the light emitting layer EL is not formed on the sensor pixel SS. That is, the sensor pixel SS does not include the light emitting layer EL.

The second electrode E2 may be disposed on the light emitting layer EL. The second electrode E2 is a common electrode and may be, for example, a cathode electrode. In an embodithe, the second electrode E2 is a transmissive or transflective electrode. For example, the second electrode E2 may transmit the light emitted from the light emitting layer EL therethrough. In an embodithe, the second electrode E2 includes a conductive material. For example, the second electrode E2 may include Li, Ca, LiF/Ca, LiF/Al, Al, Mg, BaF, Ba, Ag, Au, or Cu having a low work function or compounds or mixtures thereof. As illustrated in FIG. 8, the second electrode E2 is not formed in the sensor pixel SS. That is, the sensor pixel SS does not include the second electrode E2.

The thin film encapsulation layer TFE may be disposed on the OLED. The thin film encapsulation layer TFE may be configured to encapsulate the light emitting layer EL to prevent oxygen or moisture from permeating into the light emitting layer EL. The thin film encapsulation layer TFE may be disposed on an upper surface and side surfaces of the light emitting layer EL. The thin film encapsulation layer TFE may include at least one inorganic film to prevent oxygen or moisture from permeating into the light emitting layer EL. In addition, the thin film encapsulation layer TFE may include at least one organic film to protect the light emitting layer EL from foreign substances such as dust. The inorganic film of the thin film encapsulation layer TFE may be formed as multiple films in which one or more inorganic films of a silicon nitride layer, a silicon oxynitride layer, a silicon oxide layer, a titanium oxide layer, and an aluminum oxide layer are alternately stacked. The organic film of the thin film encapsulation layer TFE may be an organic film made of an acrylic resin, an epoxy resin, a phenolic resin, a polyamide resin, a polyimide resin, or the like.

The color filters CF1, CF2, and CF3 may be disposed on the thin film encapsulation layer TFE. The color filters CF1, CF2, and CF3 include a red color filter CF1 (e.g., a first color filter) transmitting red light therethrough, a green color filter CF2 (e.g., a second color filter) transmitting green light therethrough, and a blue color filter CF3 (e.g., a third color filter) transmitting blue light therethrough. The red color filter CF1 is disposed to correspond to the red pixel SR and transmits the red light among white light emitted from the light emitting layer EL of the red pixel SR therethrough. The green color filter CF2 is disposed to correspond to the green pixel SG and transmits the green light among white light emitted from the light emitting layer EL of the green pixel SG therethrough. The blue color filter CF3 is disposed to correspond to the blue pixel SB and transmits the blue light among white light emitted from the light emitting layer EL of the blue pixel SB therethrough. As illustrated in FIG. 8, the color filters CF1, CF2, and CF3 are not formed or located in the sensor pixel SS. That is, the sensor pixel SS does not include the color filters CF1, CF2, and CF3.

Figure 9:
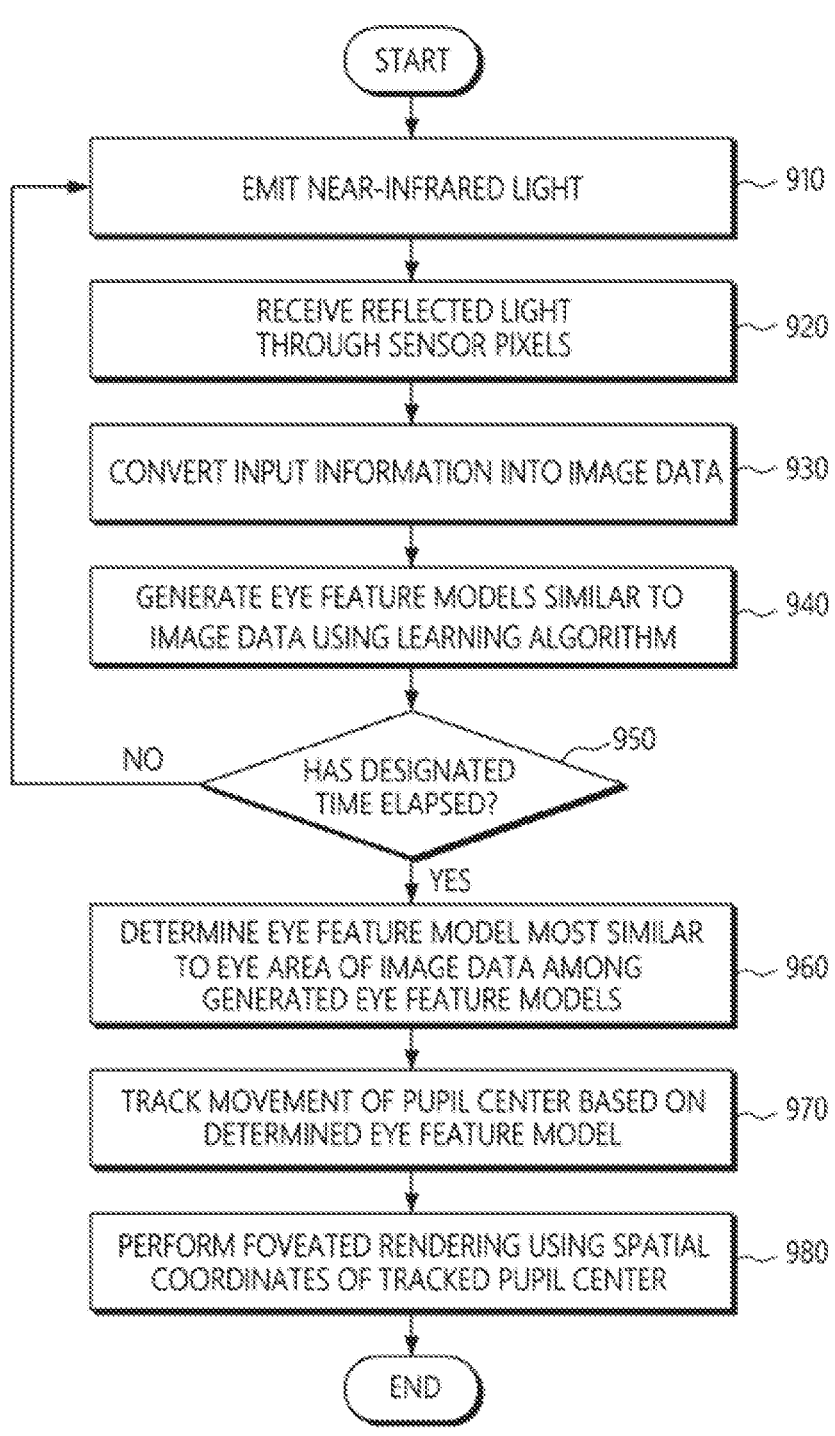
FIG. 9 is a flowchart for describing operations of the display device according to an example embodiment.
Figure 13:
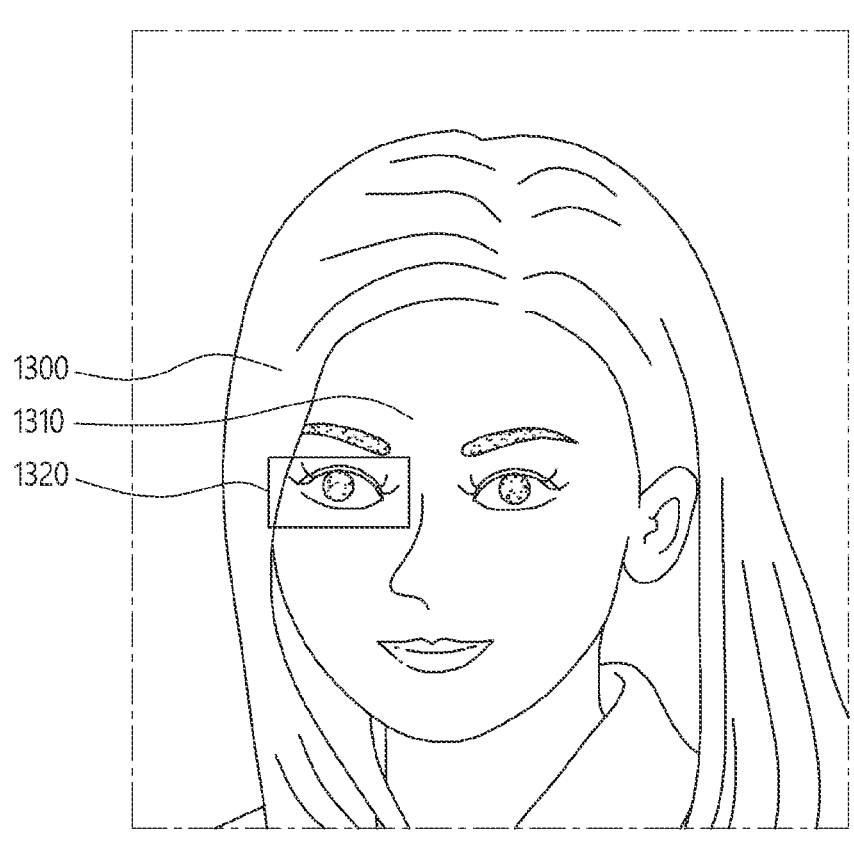
FIG. 13 is a view illustrating an example of image data obtained through a sensor pixel.
Figure 14:
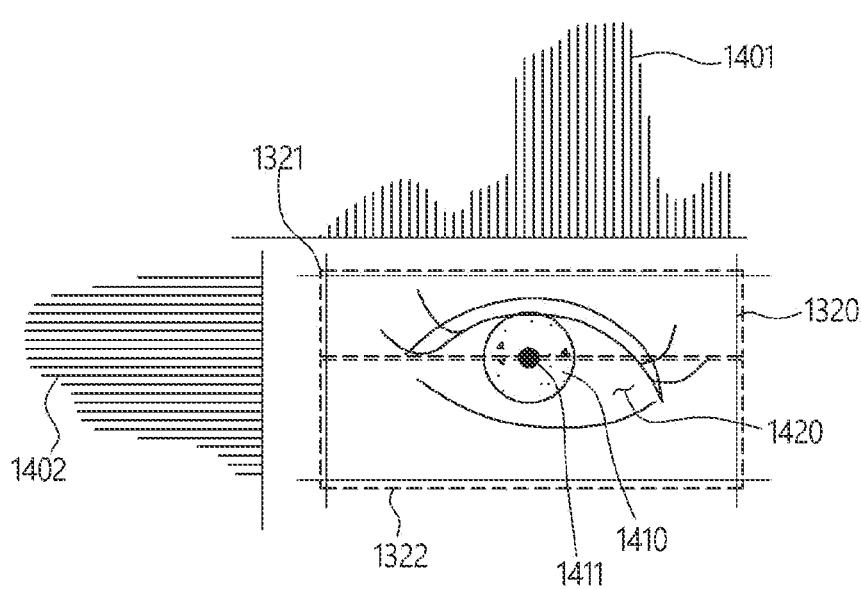
FIG. 14 is a view illustrating an example of an eye area identified by the display device according to an example embodiment.
Figure 15:
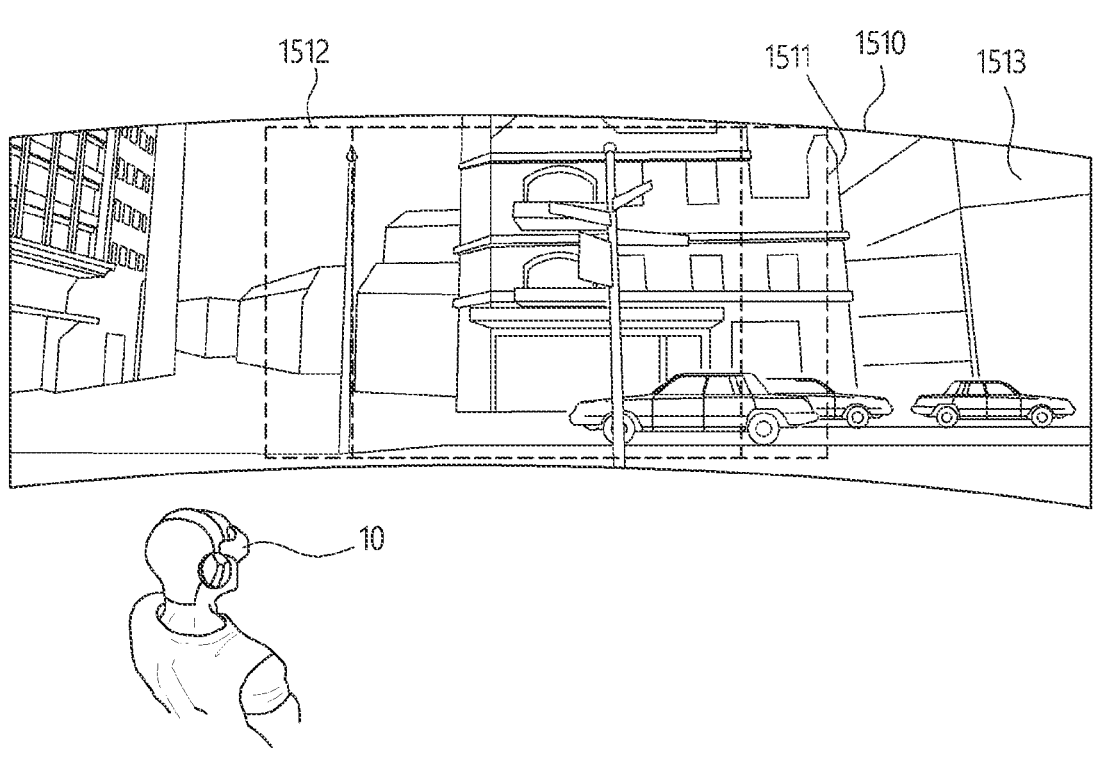
FIG. 15 is a conceptual diagram for describing foveated rendering performed by the display device according to an exemplary embodiment.

FIG. 9 is a flowchart for describing operations of the display device 10 according to an exemplary embodiment. FIGS. 10A to 10D are views illustrating examples of prototypes used for a Haar-like feature. FIGS. 11A to 11H are views illustrating other examples of prototypes used for a Haar-like feature. FIGS. 12A to 12D are views illustrating other examples of prototypes used for a Haar-like feature. FIG. 13 is a view illustrating an example of image data obtained through a sensor pixel SS. FIG. 14 is a view illustrating an example of an eye area 1320 identified by the display device 10 according to an exemplary embodiment. FIG. 15 is a conceptual diagram for describing foveated rendering performed by the display device 10 according to an exemplary embodiment.

Operations illustrated in FIG. 9 may be performed by the processor 480 of the display device 10. For example, the processor 480 may control the display device 10 to perform the operations illustrated in FIG. 9 based on the execution of the artificial intelligence application 471 stored in the memory 470. At least some of the operations illustrated in FIG. 9 may be omitted. Before or after at least some operations illustrated in FIG. 9, at least some operations mentioned with reference to other drawings in the present disclosure may be additionally inserted.

Hereinafter, operations of the display device 10 according to an exemplary embodiment will be described with reference to FIGS. 9 and 10A to 15.

In operation 910, the display device 10 according to an exemplary embodiment emits the near-infrared light 551 to perform the eye tracking function. The display device 10 tracks the movement of the user's eye using the eye tracking function. To this end, the display device 10 may perform the eye tracking function using the learning algorithm of the artificial intelligence application 471. To this end, the light source unit 550 (see FIG. 5) of the display device 10 may be configured to radiate the user's eye with the near-infrared light 551 having an output wavelength of about 780 nm to about 1400 nm.

In operation 920, the display device 10 according to an exemplary embodiment receives the reflected light reflected by the user's eye through the sensor pixels SS of the display panel. The near-infrared light 551 emitted from the light source unit 550 may be reflected from the user's eye 500, and the reflected near-infrared light (hereinafter referred to as "reflected light") may be input to the display panel 510. The display device 10 may sense brightness around the user's eye 500 or an amount of the reflected light reflected from the user's eye 500 using the sensor pixels SS. The display device 10 may convert the reflected light sensed through the sensor pixels SS into an electrical signal. The display device 10 may obtain image data 1300 (see FIG. 13) corresponding to the user's eyeball and the surroundings of the user's eyeball based on the converted electrical signal.

In operation 930, the display device 10 according to an exemplary embodiment converts information input through the sensor pixels SS into image data 1300. The display device 10 generates the image data 1300 by converting the input information into data, and sets variables to be applied to the learning algorithm. For example, the display device 10 may preprocess the input information to generate preprocessed data and generate the image data 1300 based on the preprocessed data.

The display device 10 may perform eye tracking including eye area identification and pupil tracking using the learning algorithm. The display device 10 may set the image data 1300, spatial coordinates of the image data, and light intensity values for each area of the image data mapped to the spatial coordinates as the variables to be applied to the learning algorithm.

The display device 10 may set spatial coordinates for each area of the image data 1300. For example, the display device 10 may set x-axis coordinates, y-axis coordinates, and/or z-axis coordinates of the image data 1300. Here, setting the spatial coordinates for each area of the image data 1300 may mean associating a plurality of areas of the image data 1300 with spatial coordinates including x-axis coordinates, y-axis coordinates, and/or z-axis coordinates.

The display device 10 may map the spatial coordinates for each area of the image data 1300 and light intensities (e.g., 1401 and 1402 of FIG. 14) in the corresponding areas to each other. Here, a large light intensity means that an intensity of the input reflected light is large. For example, the display device 10 may map light intensity values indicating light intensities for each area of the image data 1300.

In operation 940, the display device 10 according to an exemplary embodiment generates eye feature models similar to the image data 1300 using the learning algorithm. The display device 10 may substitute the set variables into the learning algorithm and train the learning algorithm so as to generate the eye feature models similar to the image data 1300.

The operation of the display device 10 generating the eye feature models similar to the image data 1300 using the learning algorithm may include an operation of detecting the eye area 1320 (see FIG. 14), an operation of detecting a pupil area 1410, and an operation of extracting a pupil center 1411 (see FIG. 14).

The display device 10 inputs variables to the learning algorithm. In an embodiment, the input variables include the image data 1300, the spatial coordinates of the image data 1300, and the light intensity values for each area of the image data 1300 mapped to the spatial coordinates. The learning algorithm may generate the eye feature models by repeatedly performing eye detection, eye feature point detection, and eye shape normalization processes based on the input variables.

In an embodithe, the learning algorithm extracts (or classifies) an eye feature using a Haar-like feature. The eye feature may refer to an eye size, an eye shape, or an eye feature point. Here, the eye feature point may refer to a combination of points estimated as a contour of an eye. The Haar-like feature is a method for calculating a feature value most similar to a recognition area while comparing the simple sum of designated prototypes and the recognition area with each other. Here, the recognition area refers to a partial area, which is at least a portion of the image data 1300.

FIGS. 10A to 12D illustrate examples of prototypes used for a Haar-like feature. The learning algorithm may compare the recognition area, which is a partial area of the image data 1300, and the simple sum of designated prototypes as illustrated in FIGS. 10A to 12 with each other and may calculate similarities between the recognition area and the simple sum of the designated prototypes. The learning algorithm may extract (or classify) combinations of prototypes of which similarities are higher than a designated threshold. For example, the learning algorithm may select an eye feature model most similar to the input image data 1300 while repeatedly changing the simple sum of the designated prototypes. The prototypes illustrated in FIGS. 10A to 12D will be described later in detail after all operations of FIG. 9 are described.

The learning algorithm learns an eye feature model extracted using a Haar-like feature operation using a Boost algorithm (or an AdaBoost algorithm). For example, an adaptive boost (AdaBoost) algorithm may be used, which is the simplest and most efficient algorithm of Boost algorithms. The AdaBoost algorithm generates a final eye feature model in a manner of setting an initial model as a weak learner and deriving a new model that supplements the weakness of the previous model as learning is repeated.

The learning algorithm may increase performance by grouping the generated eye feature models. For example, the learning algorithm may divide recognized eye feature models into a plurality of groups, and normalize an eye feature, that is, an eye size, an eye shape, and an eye feature point, for each of the plurality of groups. In this case, the learning algorithm may apply the AdaBoost algorithm while gradually decreasing an area of the recognition area, and accordingly, may detect the eye area 1320 and the pupil area 1410 from the image data 1300.

Referring to FIG. 13, the eye area 1320 refers to a partial area in which the eye is positioned in the image data 1300 including at least a portion of a user's face 1310. For example, the eye area 1320 may include part of the user's face 1310 other than the eye. For example, the learning algorithm may perform learning that distinguishes the eye area 1320 and a face area excluding the eye area 1320 from each other in the image data 1300 including at least a portion of the user's face 1310. The eye area 1320 may refer to a partial area including the eye and the surroundings of the eye in the user's face 1310.

Referring to FIG. 14, the pupil area 1410 refers to an area in which a pupil is positioned in the eye area 1320. The display device 10 may perform learning that distinguishes a pupil and a sclera 1420 (see FIG. 14) from each other in a portion of the image data 1300 corresponding to the eye area 1320.

According to an exemplary embodiment, the learning algorithm may identify the pupil center 1411 when the eye area 1320 and the pupil area 1410 are detected. As illustrated in FIG. 14, the learning algorithm may identify the pupil center 1411 using a half area of the eye area 1320 obtained through the Haar-like feature. The learning algorithm may identify the pupil center 1411 using an upper area 1321 positioned on the upper side in the eye area 1320 obtained through the Haar-like feature and having an area of 50%. The learning algorithm may analyze light intensity values 1401 mapped to each area in the upper area 1321 and determine a point having the greatest light intensity value 1401 as the pupil center 1411. For example, each part of the upper area 1321 may have a different light intensity value 1401, where a central point of the part with the greatest value may corresponds to the pupil center 1411.

According to an exemplary embodiment, the learning algorithm may identify the pupil center 1411 using a left area positioned on the left side in the eye area 1320 obtained through the Haar-like feature and having an area of 50%. The learning algorithm may analyze light intensity values 1402 mapped to each area in the left area and determine a point having the greatest light intensity value 1402 as the pupil center 1411.

In the above example, the identification of the pupil center 1411 by the display device 10 using the upper area 1321 or the left area is only an example, but the present disclosure is not limited thereto. For example, the present disclosure may identify the pupil center 1411 using a lower area 1322 positioned on the lower side in the eye area 1320 and having an area of 50% or identify the pupil center 1411 using a right area positioned on the right side in the eye area 1320 and having an area of 50%.

According to an exemplary embodiment, the present disclosure may identify the pupil center 1411 using the symmetry of the eye area 1320. For example, light intensities sensed in the eye area 1320 may have symmetry with respect to the pupil center 1411. The learning algorithm may estimate the pupil center 1411 using such symmetry. For example, the learning algorithm may calculate a distribution of the light intensities of the eye area 1320, and determine that a specific area is the pupil center 1411 when the distribution of the light intensities of the eye area 1320 has symmetry with respect to the specific area.

In operation 950, the display device 10 according to an exemplary embodiment determines whether or not a designated time has elapsed from a point in time when the eye tracking function is performed. The display device 10 may perform operation 960 when the designated time has elapsed from the point in time when the eye tracking function is performed (e.g., a result of operation 950 is "Yes"), and generate eye feature models by performing operations 910 to 940 again when the designated time has not elapsed from the point in time when the eye tracking function is performed (e.g., a result of operation 950 is "No"). The designated time may be set to, for example, a time within about 50 ms to about 100 ms.

In operation 960, the display device 10 according to an exemplary embodiment determines an eye feature model most similar to the eye area 1320 of the image data 1300 among the generated eye feature models.

The accuracy of the eye feature model using the Haar-like feature and the Boost algorithm may increase as the number of times of iteration of an operation increases and a time required for performing the operation elapses. However, a time used for performing eye tracking is limited to provide a high-quality foveated rendering image to the user. For example, the display device 10 may need to complete the eye tracking function within about 50 ms or about 100 ms to dynamically perform foveated rendering. Accordingly, the display device 10 may generate eye feature models during a designated time limit and select an optimal eye feature model of the eye feature models generated during the designated time limit. Here, the optimal eye feature model may refer to an eye feature model learned most similar to the eye area 1320 of the image data 1300. To this end, the display device 10 may select the eye feature model learned most similar to the eye area 1320 of the image data 1300 among the generated eye feature models when the designated time has elapsed from the point in time when the eye tracking function is performed, for example, a point in time when the near-infrared light 551 is emitted for the first time in operation 910.

The display device 10 may compare the generated eye feature models with the eye area 1320 of the image data 1300 and calculate scores indicating similarities between the generated eye feature models and the eye area 1320 of the image data 1300. For example, the higher the score, the higher the similarity between the corresponding eye feature model and the eye area 1320 of the image data 1300. The display device 10 may determine an eye feature model having the highest score.

In operation 970, the display device 10 according to an exemplary embodiment tracks the movement of the pupil center 1411 based on the determined eye feature model. The display device 10 may determine spatial coordinates corresponding to the pupil center 1411 in the determined eye feature model. The display device 10 may dynamically sense the movement of the pupil and sense a change in spatial coordinates corresponding to the movement of the pupil based on the determined eye feature model. For example, the display device 10 may determine spatial coordinates of the pupil center 1411 based on the tracking.

A pyramid Lucas-Kanade optical flow algorithm may be used as the learning algorithm, in tracking the movement of the pupil center 1411. The pyramid Lucas-Kanade optical flow algorithm is a dense optical flow method. The pyramid Lucas-Kanade optical flow is a method for constructing an image pyramid from an original image and executing tracking from an upper layer to a lower layer. However, embodiments of the present disclosure are not limited thereto. For example, the movement of the pupil center 1411 may be tracked using a sparse optical flow method.

In operation 980, the display device 10 according to an exemplary embodiment performs foveated rendering using the spatial coordinates of the tracked pupil center 1411. The display device 10 may adjust resolution of at least a portion of a display screen or a generated image using the spatial coordinates of the tracked pupil center 1411.

The display device 10 determines a sight line vector corresponding to a direction of a sight line of the user using the spatial coordinates of the pupil center 1411, and determines a central vision area corresponding to the sight line and a peripheral vision area excluding the central vision area. The display device 10 may apply foveated rendering technology to display a high-resolution screen or image in the central vision area and display a low-resolution screen or image in the peripheral vision area. For example, FIG. 15 illustrates an example of a VR screen (or an AR screen) 1510 or VR image provided by the display device 10. The user may gaze at a portion of the VR screen 1510 provided by the display device 10, and the display device 10 may perform operations 910 to 980 to sense the gaze of the user. The display device 10 determines a sight line vector corresponding to a direction of a sight line of the user using the spatial coordinates of the pupil center 1411, and determines a central vision area 1511 corresponding to the sight line vector and a peripheral vision area 1513 excluding the central vision area. The display device 10 may display a high-resolution screen or image in the central vision area 1511 and display a low-resolution screen or image in the peripheral vision area 1513.

When the user moves his/her sight line, the display device 10 may determine the movement of the central vision area 1511 by dynamically sensing the movement of the pupil center 1411. For example, when the central vision area moves from an area 1511 to an area 1512 in FIG. 15, the display device 10 may adjust resolution around the moved area 1512.

Hereinafter, various exemplary embodiments of prototypes used for a Haar-like feature will be described with reference to FIGS. 10A to 12D.

Referring to FIGS. 10A to 10D, each of prototypes used for a Haar-like feature may include edge features including one white area 1010 and one black area 1020, which are disposed in parallel with each other or adjacent one another. For example, the one white area 1010 and one black area 1020 may be vertical stripes. As illustrated in FIGS. 10A to 10D, the prototype according to the form of the edge features may include one white area 1010 and one black area 1020, and areas of the white area 1010 and the black area 1020 may be the same as each other. The white area 1010 may be used to estimate the sclera in a portion of the image data 1300. The black area 1020 may be used to estimate the pupil in a portion of the image data 1300.

Figure 10A:
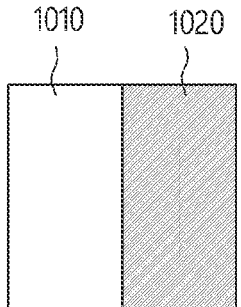
FIGS. 10A to 10D are views illustrating examples of prototypes used for a Haar-like feature.

FIG. 10A illustratively illustrates a form in which the white area 1010 and the black area 1020 are disposed on the left and right sides, respectively, among the prototypes of the edge features. In this case, the white area 1010 may be disposed on the left side of the black area 1020, but embodiments of the present disclosure are not limited thereto.

Figure 10B:
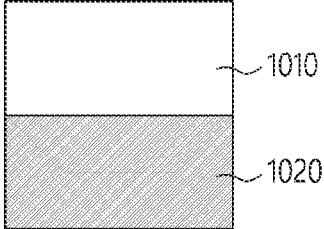

FIG. 10B illustrate a form in which the white area 1010 and the black area 1020 are disposed on the upper and lower sides, respectively, among the prototypes of the edge features. In this case, the white area 1010 may be disposed on the upper side of the black area 1020, but embodiments of the present disclosure are not limited thereto. For example, the white area 1010 and the black area 1020 may be horizontal stripes.

Figure 10C:
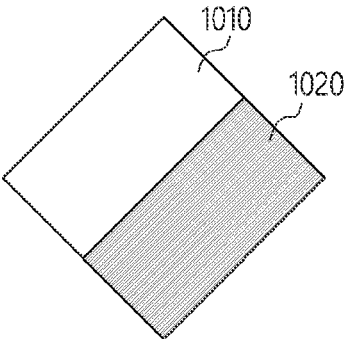
Figure 10D:
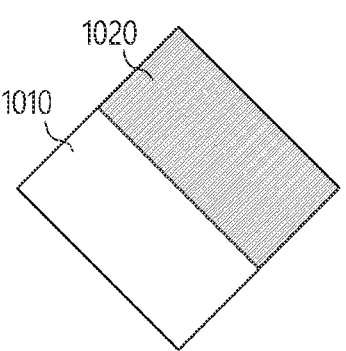

FIGS. 10C and 10D illustrate forms in which the white area 1010 and the black area 1020 are disposed in diagonal directions among the prototypes of the edge features. For example, the white area 1110 and the black area 1120 may be two diagonal stripes.

Referring to FIGS. 11A to 11H, each of prototypes used for a Haar-like feature may include line features including a pair of white areas 1110 and a black area 1120 disposed between the pair of white areas 1110. As illustrated in FIGS. 11A to 11H, the prototype according to the form of the line features includes a pair of white areas 1110 and one black area 1120. In this case, widths and lengths of each of the white areas 1110 and the black area 1120 may be different from each other. The white area 1110 may be used to estimate the sclera in a portion of the image data 1300. The black area 1120 may be used to estimate the pupil in a portion of the image data 1300. For example, the pair of white areas 1110 and the black area 1120 may be three vertical stripes.

Figure 11A:
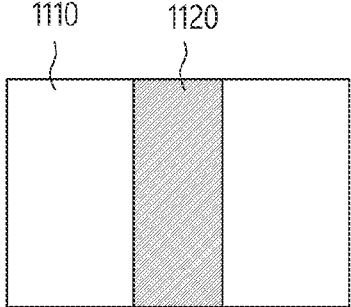
FIGS. 11A to 11H are views illustrating other examples of prototypes used for a Haar-like feature.
Figure 11B:
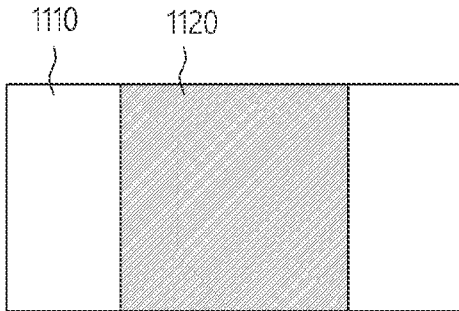

FIGS. 11A and 11B illustrate forms in which the white areas 1110 are disposed on the left and right sides of the black area 1120, respectively, among the prototypes of the line features. In an embodiment, a width of the black area 1120 is greater than a width of the white areas 1120, but embodiments of the present disclosure are not limited thereto.

Figure 11C:
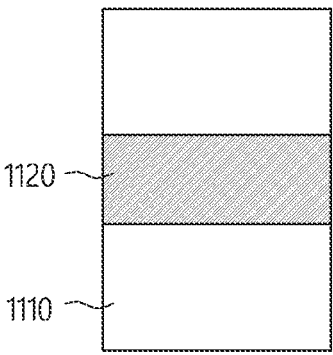
Figure 11D:
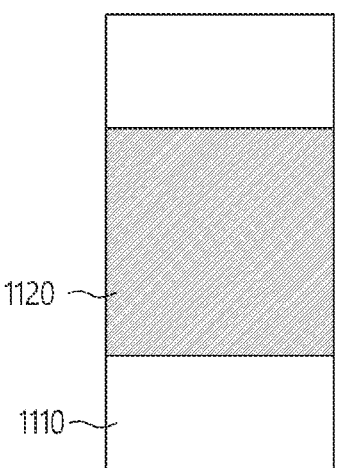

FIGS. 11C and 11D illustrate forms in which the white areas 1110 are disposed on the upper and lower sides of the black area 1120, respectively, among the prototypes of the line features. In an embodiment, a width of the black area 1120 is greater than a width of the white areas 1120, but embodiments of the present disclosure are not limited thereto. For example, the pair of white areas 1110 and the black area 1120 may be three horizontal stripes.

Figure 11E:
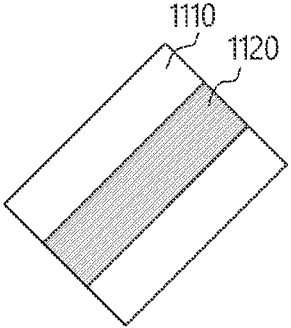
Figure 11F:
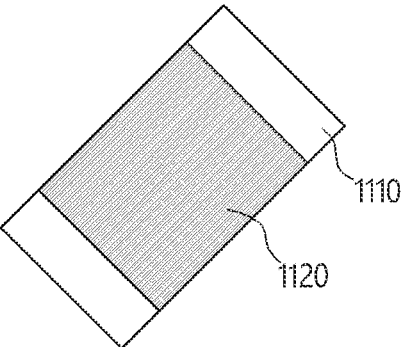
Figure 11G:
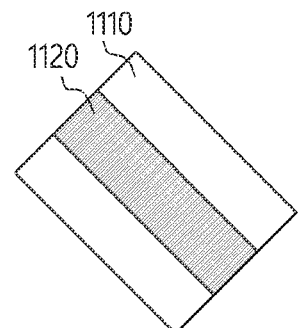
Figure 11H:
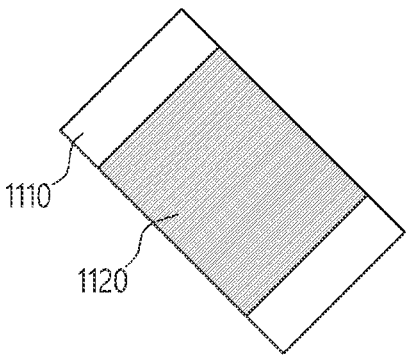

FIGS. 11E and 11H illustratively illustrate forms in which the white areas 1110 and the black area 1120 are disposed in the diagonal directions among the prototypes of the line features. For example, the white areas 1110 and the black area 1120 may extend to have a designated angle from a virtual horizontal line. In an embodiment, a width of the black area 1120 is greater than a width of the white areas 1120, but embodiments of the present disclosure are not limited thereto. For example, the pair of white areas 1110 and the black area 1120 may be three diagonal stripes.

Referring to FIGS. 12A to 12D, each of prototypes used for a Haar-like feature may include center-surround features including one black area 1220 and a white area 1210 disposed to surround an outer side of the one black area 1220. As illustrated in FIGS. 12A to 12D, the prototype according to the form of the center-surround features includes one white area 1210 and one black area 1220. In an embodiment, widths and lengths of each of the white area 1210 and the black area 1220 may be different from each other. The white area 1210 may be used to estimate the sclera in a portion of the image data 1300. The black area 1220 may be used to estimate the pupil in a portion of the image data 1300.

Figure 12A:
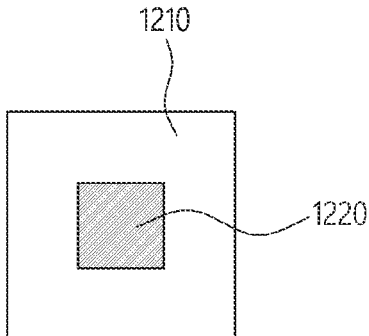
FIGS. 12A to 12D are views illustrating other examples of prototypes used for a Haar-like feature.
Figure 12B:
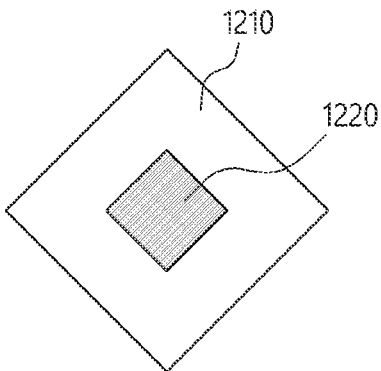

FIGS. 12A and 12B illustrate forms in which each of the white area 1210 and the black area 1220 has a rectangular shape among the prototypes of the center-surround features. In an embodiment, a width of the black area 1220 is greater than a width of the white areas 1210, but embodiments of the present disclosure are not limited thereto.

Figure 12C:
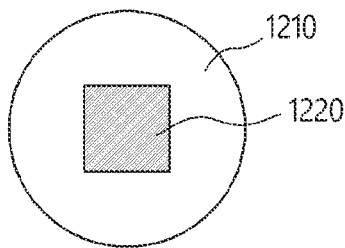
Figure 12D:
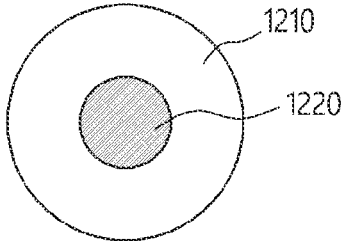

FIGS. 12C and 12D illustrate forms in which each of the white area 1210 and the black area 1220 has a rectangular shape or a circular shape among the prototypes of the center-surround features. For example, as illustrated in FIG. 12C, the black area 1220 has a rectangular shape, and the white area 1210 has a circular shape disposed outside the black area 1220. For example, as illustrated in FIG. 12D, the black area 1220 has a circular shape, and the white area 1210 has a circular shape disposed outside the black area 1220.

In concluding the detailed description, those skilled in the art will appreciate that many variations and modifications can be made to the embodiments without substantially departing from the principles of the present invention. Therefore, the disclosed embodiments of the invention are used in a generic and descriptive sense only and not for purposes of limitation.

What is claimed:

1. A display device comprising:
   a transparent layer disposed to correspond to a display area of a lens;
   a light source emitting near-infrared light;
   a display panel including normal pixels for displaying an image and sensor pixels including photodiodes, a number of sensor pixels being less than the number of the normal pixels;
   a reflective member reflecting display light emitted from the display panel toward the transparent layer; and
   a processor configured to:
      control the light source to emit the near-infrared light,
      receive information from the sensor pixels based on the near-infrared light reflected by an eye of a user,
      convert the information received from the sensor pixels into image data,
      generate eye feature models representing an eye area of the eye from the image data using a learning algorithm,
      determine an eye feature model data among the generated eye feature models that is most similar to an eye area of the image data,
      track movement of a pupil center of the eye based on the determined eye feature model to determine spatial coordinates of the pupil center, and
      display a first part of the image in high-resolution in a central vision area corresponding to a direction of a sight line of the user and display a second part of the image in low-resolution in a peripheral vision area excluding the central vision area, using the spatial coordinates.

2. The display device of claim 1, wherein the processor is configured to:
   determine whether or not a designated time has elapsed from a point in time when the near-infrared light is emitted,
   compare each of the eye feature models generated during the designated time with the eye area of the image data when the designated time has elapsed to generate a comparison result,
   calculate scores indicating similarities of the eye area of the image data for each of the eye feature models based on the comparison result, and
   select an eye feature model among the eye feature models having a highest score among the scores.

3. The display device of claim 1, wherein the processor is configured to set the image data, spatial coordinates of the image data, and light intensity values for each area of the image data mapped to the spatial coordinates as input variables input to the learning algorithm.

4. The display device of claim 3, wherein the learning algorithm is configured to perform learning by executing an artificial intelligence application stored in a memory by the processor.

5. The display device of claim 4, wherein the learning algorithm is configured to generate the eye feature model by performing an operation of detecting the eye area of the eye from the image data, an operation of detecting a pupil area of the eye from the image data, and an operation of extracting the pupil center of the eye from the image data.

6. The display device of claim 5, wherein the learning algorithm is configured to extract an eye feature for the eye feature model from the image data using a Haar-like feature, the eye feature including at least one of an eye size, an eye shape, or an eye feature point.

7. The display device of claim 6, wherein the learning algorithm is configured to learn the eye feature model generated using the Haar-like feature using an adaptive boost (AdaBoost) algorithm.

8. The display device of claim 6, wherein the Haar-like feature is set to generate the eye feature model by summing up prototypes according to a form of edge features including one white area and one black area which are disposed in parallel with each other.

9. The display device of claim 6, wherein the Haar-like feature is set to generate the eye feature model by summing up prototypes according to a form of line features including a pair of white areas and a black area disposed between the pair of white areas.

10. The display device of claim 6, wherein the Haar-like feature is set to generate the eye feature model by summing up prototypes according to a form of center-surround features including one black area and a white area disposed to surround the one black area, and the black area and the white area have a rectangular shape or a circular shape.

11. A method for driving a display device, the display device including a transparent layer disposed to correspond to a display area of a lens, a light source emitting near-infrared light, a display panel including normal pixels to display an image and sensor pixels including photodiodes, a number of sensor pixels being smaller than the number of the normal pixels, and a reflective member reflecting display light emitted from the display panel toward the transparent layer, the method comprising:

controlling the light source to emit the near-infrared light;

receiving information from the sensor pixels based on the near-infrared light reflected by an eye of a user;

converting the information received from the sensor pixels into image data;

generating eye feature models representing an eye area of the eye from the image data using a learning algorithm;

determining an eye feature model among the generated eye feature models most similar to an eye area of the image data;

tracking movement of a pupil center of the eye based on the determined eye feature model to determine spatial coordinates of the tracked pupil center; and displaying a first part of the image in high-resolution in a central vision area corresponding to a direction of a sight line of the user and displaying a second part of the image in low-resolution in a peripheral vision area excluding the central vision area, using the spatial coordinates.

12. The method of claim 11, wherein the determining of the eye feature model comprises:

determining whether or not a designated time has elapsed from a point in time when the near-infrared light is emitted;

comparing each of the eye feature models generated during the designated time with the eye area of the image data when the designated time has elapsed to generate a comparison result;

calculating scores indicating similarities of the eye area of the image data for each of the eye feature models based on the comparison result; and selecting an eye feature model among the eye feature models having a highest score among the scores.

13. The method of claim 11, further comprising setting the image data, spatial coordinates of the image data, and light intensity values for each area of the image data mapped to the spatial coordinates as input variables input to the learning algorithm.

14. The method of claim 13, wherein the learning algorithm is configured to perform learning by executing an artificial intelligence application stored in a memory by a processor.

15. The method of claim 14, wherein the learning algorithm is configured to generate the eye feature model by performing an operation of detecting the eye area of the eye from the image data, an operation of detecting a pupil area of the eye from the image data, and an operation of extracting the pupil center of the eye from the image data.

16. The method of claim 15, wherein the learning algorithm is configured to extract an eye feature for the eye feature model from the image data using a Haar-like feature, the eye feature including at least one of an eye size, an eye shape, or an eye feature point.

17. The method of claim 16, wherein the learning algorithm is configured to learn the eye feature model generated using the Haar-like feature using an adaptive boost (Ada-Boost) algorithm.

18. The method of claim 16, wherein the Haar-like feature is set to generate the eye feature model by summing up prototypes according to a form of edge features including one white area and one black area which are disposed in parallel with each other.

19. The method for driving a display device of claim 16, wherein the Haar-like feature is set to generate the eye feature model by summing up prototypes according to a form of line features including a pair of white areas and a black area disposed between the pair of white areas.

20. The method of claim 16, wherein the Haar-like feature is set to generate the eye feature model by summing up prototypes according to a form of center-surround features including one black area and a white area disposed to surround the one black area, and the black area and the white area have a rectangular shape or a circular shape.

* * * * *